US008875241B2

(12) United States Patent
Winter et al.

(10) Patent No.: US 8,875,241 B2
(45) Date of Patent: Oct. 28, 2014

(54) OPTICAL MEDIA PROTECTION DRIVER

(75) Inventors: Andreas Winter, Altenmarkt (AT);
Michael Kurz, Bad Durrnberg (AT)

(73) Assignee: SONY DADC Austria AG, Anif (AT)

( * ) Notice: Subject to any disclaimer, the term of this patent is extended or adjusted under 35 U.S.C. 154(b) by 1466 days.

(21) Appl. No.: 10/552,288

(22) PCT Filed: Mar. 25, 2004

(86) PCT No.: PCT/EP2004/003177
§ 371 (c)(1),
(2), (4) Date: Oct. 3, 2005

(87) PCT Pub. No.: WO2004/088658
PCT Pub. Date: Oct. 14, 2004

(65) Prior Publication Data
US 2006/0236403 A1 Oct. 19, 2006

(30) Foreign Application Priority Data

Apr. 4, 2003 (EP) .................................. 03007801

(51) Int. Cl.
*G06F 17/30* (2006.01)
*G11B 20/00* (2006.01)
*G06F 21/10* (2013.01)

(52) U.S. Cl.
CPC .......... *G06F 21/10* (2013.01); *G11B 20/00659* (2013.01); *G06F 2221/0744* (2013.01); *G11B 20/00695* (2013.01); *G11B 20/00688* (2013.01); *G11B 20/00086* (2013.01); *G11B 20/00884* (2013.01); *G11B 20/00927* (2013.01); *G06F 2221/2153* (2013.01); *G11B 20/00202* (2013.01); *G11B 20/00173* (2013.01)
USPC .............................................. 726/4; 380/201

(58) Field of Classification Search
USPC ......... 713/153, 165, 170–171, 189, 193, 161, 713/180–181; 711/100–105, 111–112, 711/163–164; 380/202, 239, 241, 259–264, 380/37, 42, 277, 28–30; 726/1–6, 27, 30; 707/698
See application file for complete search history.

(56) References Cited

U.S. PATENT DOCUMENTS 5,390,327 A * 2/1995 Lubbers et al. .................. 714/7
5,446,855 A * 8/1995 Dang et al. ....................... 711/1

(Continued)

FOREIGN PATENT DOCUMENTS

EP 0 930 615 7/1999
EP 0 930 616 7/1999

(Continued)

OTHER PUBLICATIONS

Office Action issued Nov. 1, 2011 in Japan Application No. 2006-504864 (With English Translation).
Office Action issued Jan. 13, 2011, in Japan Patent Application No. 2006-504864 (with English translation).

(Continued)

*Primary Examiner* — Joseph P. Hirl
*Assistant Examiner* — Leynna Truvan
(74) *Attorney, Agent, or Firm* — Oblon, Spivak, McClelland, Maier & Neustadt, L.L.P.

(57) ABSTRACT

A method to protect content within protected data areas on a target optical record carrier against unauthorized reading and/or copying with a computer, comprises the steps of—determining whether a target optical record carrier or a non-target optical record carrier is inserted into a drive of the computer, and—in case a target optical record carrier is inserted into the drive of the computer—modifying read requests to the protected data areas so that no data is read or the read data is useless, and/or—modifying write commands in respect to the data within the protected data areas to a recordable record carrier or other storage so that the written data is useless.

17 Claims, 3 Drawing Sheets

(56) References Cited

U.S. PATENT DOCUMENTS

Figure 1:
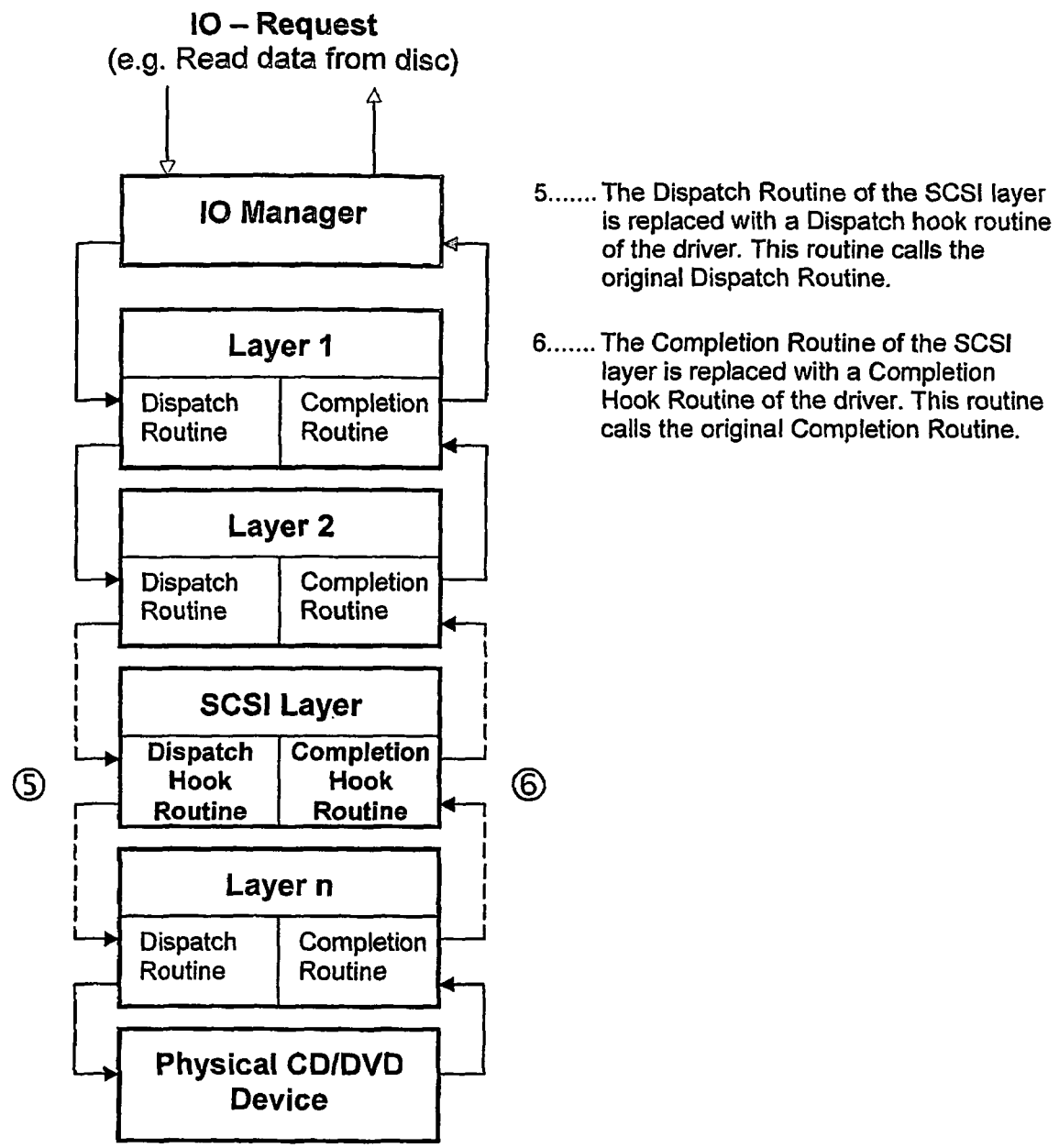

| | | | |
|---|---|---|---|
| 5,548,784 A * | 8/1996 | Easley, Jr. et al. | 710/18 |
| 5,748,596 A * | 5/1998 | Nakamichi | 369/30.9 |
| 6,128,699 A * | 10/2000 | Golding | 711/112 |
| 6,523,102 B1 | 2/2003 | Dye et al. | |
| 6,532,201 B1 * | 3/2003 | Hogan | 369/53.21 |
| 6,697,881 B2 * | 2/2004 | Cochran | 710/5 |
| 6,952,479 B2 * | 10/2005 | Shavit et al. | 380/201 |
| 6,978,345 B2 * | 12/2005 | Tomaszewski et al. | 711/112 |
| 7,127,066 B2 * | 10/2006 | Solomon et al. | 380/201 |
| 2002/0004884 A1 | 1/2002 | Yamakawa et al. | |
| 2002/0023225 A1 * | 2/2002 | Lomnes | 713/200 |
| 2002/0174102 A1 | 11/2002 | Kyler | |
| 2003/0005297 A1 * | 1/2003 | Fichtner et al. | 713/168 |

FOREIGN PATENT DOCUMENTS

| | | |
|---|---|---|
| EP | 1 081 697 | 3/2001 |
| EP | 1 211 681 | 6/2002 |
| JP | 2001-184789 | 7/2001 |
| JP | 2002-319245 | 10/2002 |
| WO | WO 01/025870 A3 | 4/2001 |

OTHER PUBLICATIONS

Office Action issued May 4, 2012 in European Application No. 03007801.8.

U.S. Appl. No. 13/371,952, filed Feb. 13, 2012, Holzapfel, et al.

Voelcker J et al: "How Disks Are 'Padlocked'" IEEE Spectrum, IEEE Inc. New York, US, vol. 23, No. 6, Jun. 1, 1986, pp. 32-40, XP002054317.

* cited by examiner

CDB .................... SCSI Command Descriptor Block
Data buffer .......... Depending on the CDB the
                       bufferlength can be a value >= 0
Data buffer ext..... Extension to the data buffer used
                       for CCI.

CDB .................... SCSI Command Descriptor Block
Data buffer .......... Depending on the CDB the
                       bufferlength can be a value >= 0

OPTICAL MEDIA PROTECTION DRIVER

The present invention relates to a method to protect content within protected data areas on a target optical record carrier against unauthorized reading and/or copying with a computer, and an optical record carrier.

Optical storage carriers with information stored on one or both sides have come to be used for a variety of purposes, most notably in the music, games, video, and computer industry. Digital information is stored on the optical storage media in the form of pits arranged along circular, concentric tracks on one or on both sides of the disc. The track is typically read from the inside out, but may also be read form outside in, as it is already used for some optical storage media.

The data itself on the track is subdivided into frames, each equal in length, containing equal amounts of information. Each frame has a dedicated layout depending on the type of optical storage media (CD, DVD). Such a frame always contains the user data symbols itself but may also contain data for synchronization, merging data between data symbols and error correction.

The signal on an optical storage medium itself is asynchronous, which means that in the decoding process synchronization, timing information, parity data or other data has to be spied out from the signal and the signal has to fulfil certain requirements so that it is accessible by a reading device.

Due to the nature of such storage media copies can be made easily. To cope with this situation, there exist various copy protection schemes according to which the data relating to the information itself and/or the other data on the storage medium providing access information or relating to the synchronization gets altered to prohibit digital copying while accomplishing accessibility by playback devices.

Generally, these copy protection schemes prevent a playback of the information content on computer drives by confusing these drives at least in respect to the access of the information content. To secure an access to the content, a quality reduced version of the content, which is stored "copy protected" in a first session of the optical record carrier, might be provided in a computer accessible manner in a second session of the optical record carrier. Alternatively, the second session might comprise a link to a content server to provide a computer access. Such a content server might also comprise added value, e.g. music clips or bonus material related to the information content on the optical record carrier. The access to the content stored in the second session and/or to the content server might be provided through an executable file that automatically starts after the copy protected optical record carrier is inserted into the computer drive.

In view of the above, it is the object underlying the present invention to provide an improved system to protect content within protected data areas on a target optical record carrier against unauthorized reading and/or copying with a computer.

According to the present invention, this object is solved by a method to protect content within protected data areas on a target optical record carrier against unauthorized reading and/or copying with a computer as defined in independent claim 1. Preferred embodiments of the method according to the present invention are defined in the respective dependent claims. A computer program product according to the present invention is defined in claim 12, a computer readable storage means according to the present invention is defined in claim 13, and an optical record carrier according to the present invention is defined in claim 14.

The method to protect content within protected data areas on a target optical record carrier against unauthorized reading and/or copying with a computer according to the present invention comprises the steps of
  determining whether a target optical record carrier or a non target optical record carrier is inserted into a drive of the computer, and
  in case a target optical record carrier is inserted into the drive of the computer
    modifying read requests to the protected data areas so that no data is read or the read data is useless, and/or
    modifying write commands in respect to the data within the protected data areas to a recordable record carrier or other storage so that the written data is useless.

Therewith, according to the present invention a copy protection is provided that works on a different level in respect to the known copy protection schemes, since, according to the present invention, not the content to be protected or information relating thereto or to secure the access to the information is altered. Therefore, this scheme allows full accessibility to existing playback devices other than computer drives. On the other hand, computers on which the method according to the present invention is provided cannot access and/or copy target optical record carriers, i.e. such optical record carriers that are copy protected according to the present invention, since the read requests and/or write commands are modified so that the data in the protected areas, i.e. specially designated areas, e.g. an audio session of a CD, is read and/or written to be useless data.

It is self-evident that according to the present invention a target optical record carrier is somehow distinguishable from a non-target optical record carrier and that the method according to the present invention has somehow to be implemented in the used computer.

In the method according to the present invention, preferably the modifying of read requests and/or of write commands is performed only in case no authentication is available.

This scheme widens the concept of not allowing any computer reading and/or writing so that a user with authentication can fully access the protected content with a computer. Provisions might also be given that such accessed content might not be accessible by a computer from a copy thereof, since the copy might be indicated to be not accessible by a computer. Also, it is possible to produce a copy to which a different authentication might provide access. In this way also the number of 'child levels' of an original might be defined, i.e. the number of levels that allow a copy, e.g. only an original and a direct copy thereof allow copying with a respective authentication.

In a preferred embodiment of the present invention, the determining and modifying steps are performed by routines implemented into a drive control layer within the computer.

This allows the implementation of the inventive method into a computer without having to reboot the computer, which would be annoying for a user, because the reboot usually takes a time. The drive control layer is generally a layer that controls the computer drive, e.g. a SCSI layer.

In this preferred embodiment, preferably the routines
  replace a dispatch routine and a completion routine, and
  have the functionality to perform the determining and modifying steps and to call the replaced dispatch and completion routines for their execution based on the original or modified read requests and/or write commands.

These features allow that e.g. by default the behaviour of the operating system of the computer is not changed by the implementation of the present invention. Further, also the basic functionality of this operating system in respect to the 'replaced' routines might be used by calling them with modified parameters to avoid replacement thereof, which prevents the occurrence of unwanted system failures.

Alternatively or additionally, in this embodiment, preferably the routines are implemented by a driver that gets installed by an executable that gets automatically started when a target optical record carrier is inserted into the drive.

This procedure allows the use of the computer driver technology after the driver is installed at least once. Therewith, the installed driver might be automatically loaded after each new start of the computer so that other target optical record carriers that do not comprise the executable are copy protected according to the method according to the present invention. Of course, it is possible to install the driver in any other way on the computer, e.g. through a different application when the user is executing this different application on the computer, while the user is accessing an internet server, or with the installation of the operating system of the computer.

Preferably, the driver
gets automatically loaded after each start of the computer, and/or
does not comprise an unload routine, and/or
changes its name randomly, and/or
comprises filetimes that are set randomly, and/or
comprises code that is changed randomly, and/or
is installed multiple times, but is only one time active, and/or
can be installed by installation programs spread all over the computer's system.

These features of the driver according to the present invention aim to make the driver resident and not easy to remove within the operating system computer so that after a first installation preferably no second installation is needed, but the copy protection scheme according to the present invention is permanently available on the particular computer. Therewith, also target optical record carriers are copy protected that do not bring the implementation of the copy protection according to the present invention with them, e.g. old target optical record carriers. These target optical record carriers just need to have the identification features that identify a target optical record carrier to be applicable to the copy protection according to the present invention.

Alternatively or additionally preferably the driver comprises a communication interface to allow an exchange of control data and/or authentication data.

This communication interface might be used to indicate protected areas on a target optical record carrier, to communicate authentication data to the driver, and/or to establish a communication among different installed drivers according to the present invention to achieve that only one of them is active. The communication via the communication interface is preferably encrypted.

According to the present invention a target optical record carrier might be distinguished from a non target optical record carrier by evaluating
a predetermined session of the optical record carrier in respect to special modifications, and/or
at least one of the tables of contents of the optical record carrier in respect to special entries, and/or
a predetermined session of the optical record carrier in respect to special subcode modifications, and/or
predetermined data stored on the optical record carrier in respect to a watermark.

Therewith, according to the present invention a target optical record carrier might simply carry a special sign that classifies it as a target optical record carrier. However, also more sophisticated features might be used, e.g. every record carrier that comprises a copy protection of some kind might be classified as a target optical record carrier or record carriers that comprise a particular special copy protection or that comprise an indication identifying a particular disc label, . . . . Therewith, according to the present invention predetermined 'cracked' copy protection schemes can be re-activated or predetermined optical record carriers that are identifiable by their content might be 'equipped' with a copy protection even after their delivery and selling.

According to the present invention, preferably a protected data area is identified on basis of
a sector type, and/or
a range of sectors, and/or
sectors that are subject of specific read sequences.

Therewith, according to the present invention a protected data area must not be static for a particular target optical record carrier, but can also be dynamic, e.g. based on certain accessing characteristics, e.g. in case the access of a disc cloning program or a ripping program is detected.

According to the present invention, preferably a protected data area is defined by
at least one predetermined area, and/or
data stored on the optical record carrier itself.

The predetermined data area might be fixed, e.g. always the audio session or predetermined range of sectors, or variable. A variable predetermined data area might be indicated to the driver through its communication interface. The driver can also derive a variable predetermined data area from the target optical record carrier, e.g. on basis of its table of contents or on basis of a list that is stored on the target optical record carrier.

According to the present invention, preferably the modifying of read requests so that the read data is useless, and/or the modifying of write commands so that the written data is useless comprises
to abort a corresponding IO Request and/or IO Command with an error, and/or,
to complete the corresponding IO Request and/or IO Command, but without processing the actual request and/or command, and/or
to modify the respective data so that it is useless.

The modification of data so that it is useless might include the replacement of data with arbitrary or predetermined values so that e.g. the play of a copied audio CD is disturbed or that a comment is given that no original is reproduced.

The computer program product according to the present invention comprises computer program means adapted to perform the method steps as set-out above when being executed on a computer, digital signal processor, or the like.

The computer readable storage means according to the present invention comprises a computer program product according to the present invention.

The optical record carrier according to the present invention comprises an executable that gets automatically started when the optical record carrier is inserted into the drive and that
performs the method steps as set-out above when being executed on a computer, digital signal processor, or the like, and/or
installs a driver that performs the method steps as set-out above when being executed on a computer, digital signal processor, or the like.

In other words, the optical record carrier comprises an executable that might directly and/or indirectly implement the method according to the present invention.

As indicated above, according to the present invention, the optical record carrier is preferably a multi-session CD that comprises an audio session and a data session with the executable that preferably has an autostart functionality. However, the autostart functionality is not mandatory.

Figure 2:
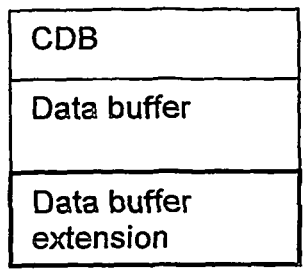
Figure 4:
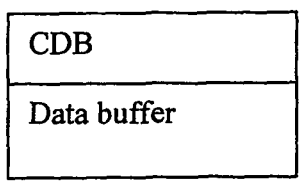
Figure 3:
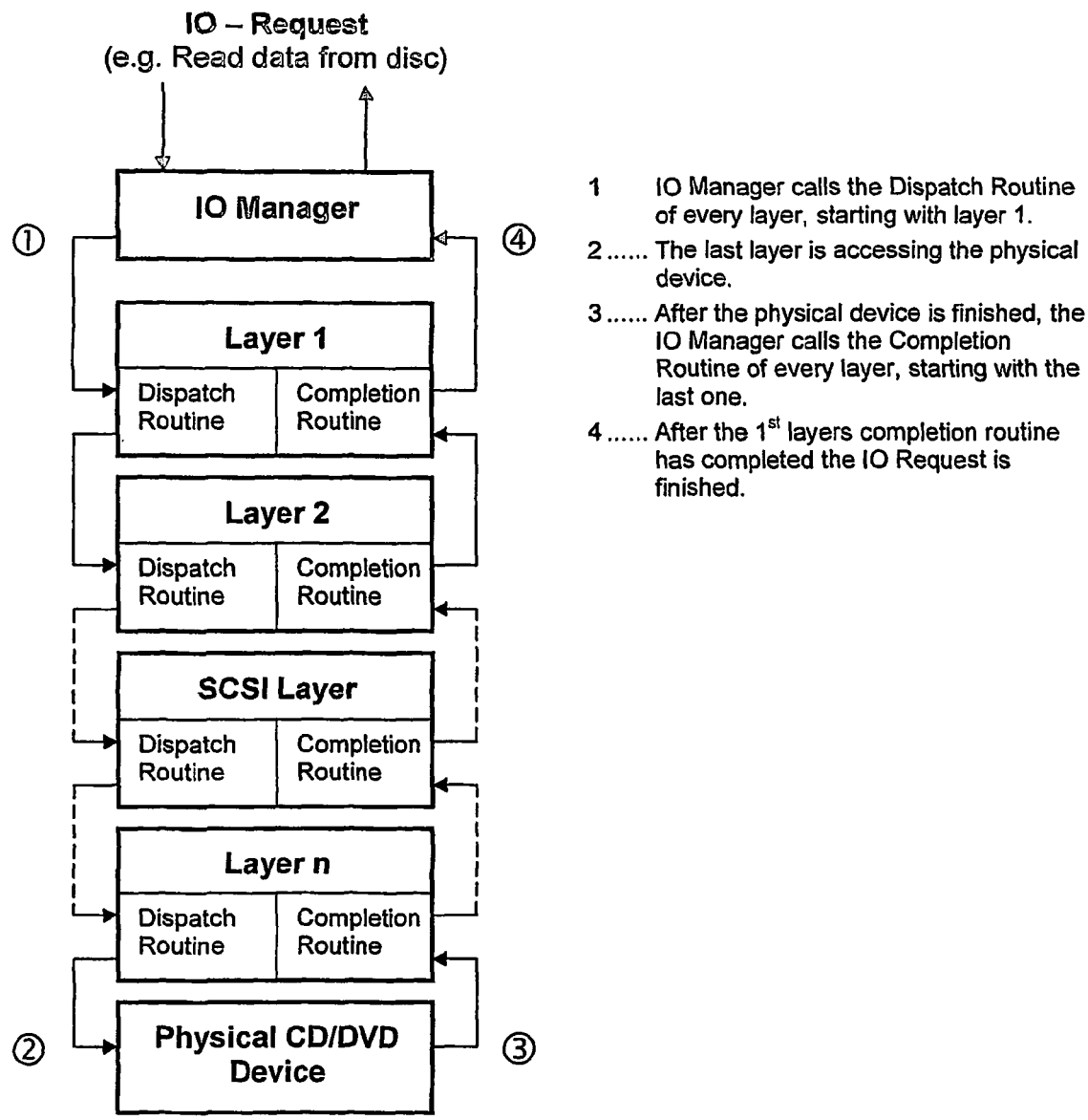

All different aspects of the present invention as set-out above and further elucidated below might be combined in any way. The accompanying drawings, which are incorporated in and constitute a part of this specification, illustrate an exemplary embodiment of the invention and, together with a general description of the invention given above, and the detailed description of the embodiment given below, serve to explain the principles of the invention, wherein:

FIG. 1 shows a simplified scheme of the processing of an IO request in a multi layered driver model according to the present invention, FIG. 2 shows a rough structure of a modified SCSI command used for the communication interface according to the present invention, FIG. 3 shows a simplified scheme of the processing of an IO request in a multi layered driver model according to the prior art, and FIG. 4 shows a rough structure of a SCSI command according to the prior art.

According to the following exemplary embodiment of the present invention optical media of specially marked discs (target discs) are protected against illegal reading and/or copying. For this protecting of content on optical media (e.g. CD, DVD . . . ) against illegal reading a disc containing data in a standard fileformat (ISO, UDF . . . ), readable by operating systems (e.g Windows) is used (called data session). Beside the data session the disc can have any number of other sessions no matter, which type.

At least the following parts are included in the data session:
Specially modified software (called EXE in the following). This EXE is typically a startup menu.
Enabled autoplay, which starts the EXE after the optical media was inserted into the drive.

When the EXE is launched, either after a medium was inserted (autoplay) in the drive or by a user starting it manually, it will extract and install a specially designed filter driver (called driver in the following) which performs the following tasks:
Distinguishing between target discs, which are intended to be protected, and non target discs.
Modifying specific SCSI read requests to the target disc's protected data areas in a way that makes the read data useless.

Also, write commands directed to writing such data that relates to the target disc's protected data to a recordable disc or to another memory might be modified in a way that makes the written data useless. The data that relates to the target disc's protected data might be identified by a watermark or other suitable mechanisms.

As the standard way of implementing and applying filter driver forces a reboot of the operating system, a particular and specific filtering method is used.

FIG. 3 shows a simplified scheme how an IO request is processed in a multi layered driver model as e.g. used in Windows operating systems. Marked with ① is the call of the Dispatch Routine of every layer by an IO Manager, starting with layer 1. The last layer is accessing the physical device, which is marked with ②. After the physical device is finished, the IO Manager calls the Completion Routine of every layer, starting with the last one, which is marked with ③. After the first layers completion routine has completed the IO Request is finished, which is marked with ④.

According to the exemplary embodiment of the present invention, the driver searches for the SCSI layer and inserts its own routines DHR (Dispatch Hook Routine) and CHR (Completion Hook Routine) instead of the original Dispatch and Completion Routines, as it is indicated in FIG. 1. DHR as well as CHR call their original counterparts, i.e. the original dispatch routine and the original completion routine, so that by default the behaviour of the system is not changed through the injection of the hook routines.

In particular, FIG. 1 elucidates how the driver is able to keep track of every SCSI command sent to a CD/DVD device by inserting the Dispatch and the completion Hook routines into the SCSI layer. Marked with ⑤ is that the Dispatch Routine of the SCSI layer is replaced with a Dispatch hook routine of the driver. This routine calls the original Dispatch Routine. Marked with ⑥ is that the Completion Routine of the SCSI layer is replaced with a Completion Hook Routine of the driver. This routine calls the original Completion Routine.

So that the driver is able to keep track of every SCSI request, which is sent to a CD/DVD drive by using DHR and CHR, the following tasks are performed inside DHR and CHR:
Distinguishing target discs from non target discs.
Carry out modifications if a target disc was properly identified.
Handling CCI requests (Covert Communication Interface)

To distinguish between target and non target discs the following criteria are used in any combination:
Special modifications in the $2^{nd}$ session.
Special TOC entries.
Special subcode modifications (either in the 1st or the second session).
Watermark in the (audio) data The protected data is part of the target disc. The following criteria might be used to identify protected data areas on a target disc:
Sector type, which means all sectors of a specified type (CDDA, Mode 1, . . . ) are part of the protected data area.
Range of sectors, wherein a protected data area can be defined by specifying a start- and an endsector.
Detecting specific read sequences, e.g. sequential reads, which are typical for disc cloning and ripping programs, are detected and all further read requests are denied.
The protected data area can be either protected:
Totally, which means that no read request to the protected area is allowed. No matter, which application performs the request.
Disengageable, which means that trusted applications can authenticate themselves by sending authentication data via the CCI (Covert Communication Interface), which enables only the authenticated process to read the protected data.

So one or multiple protected data areas can be specified with the above criteria in any combination.
The protected data areas can be defined by:
the driver (hardcoded in the driver program code)
data stored on the disc
combination of both
If a target disc was properly identified, the following modifications might be done to SCSI read requests, which try to read protected data:
The IO Request is aborted (completed) with an error.
The IO Request is completed with STATUS_SUCCESS, without processing the actual read.
The read data is modified, so that it is useless.

To protect the driver against removal from the system one or more of the following measures might be taken The driver can not be unloaded, because it does not have an "Unload routine".

The driver name changes randomly
- The installation process chooses a random name (done by EXE).
- The driver changes its name during system runtime and/or during system shutdown randomly.

The driver filetimes (creation time, last access time and last write time) are set randomly during the installation sequence (done by EXE) and/or during runtime.

The driver program code is changed randomly (without changing its functionality) during the installation sequence. (done by EXE).

The driver installs itself multiple times and except one all other instances of the driver are inactive.
- There is a covert and protected communication interface between the drivers to check if there is already an active driver instance running.
- If a driver detects another one already running, it will set itself inactive.

Spread driver installation programs (hidden) all over the system.

In the following the Covert Communication Interface (CCI) according to the present invention is described, which is used for allowing software to communicate with the driver, e.g. for authentication, and/or allowing drivers to communicate with each other, e.g. in case multiple instances of a driver are installed.

SCSI commands are used to send and receive data to and from the driver (piggy back). FIG. 4 shows the rough structure of a SCSI command, which consists of a CDB, i.e. SCSI Command Descriptor Block, and, if the sent command requires it, a data buffer as well. Depending on the CDB the Data buffer could be used for storing read data (read command), or as data source if a write command is executed. The bufferlength can be a value >=0 also depending on the CDB According to the exemplary embodiment of the present invention, for communication purposes a larger datablock as required for the SCSI command is attached to the SCSI command to generate a modified SCSI command for use for the covert communication interface (CCI), as shown in FIG. 3. The data buffer area which is not needed for the SCSI command will in the following be named as DBE (Data buffer extension).

The DBE is used for CCI and contains information, which is detected and evaluated by the driver and the driver will place possible return values in the DBE as well.

The content of the DBE is encrypted by the sender and decrypted by the driver. If the driver places return values in the DBE it will encrypt the DBE afterwards and the sender will decrypt the DBE again.

All SCSI commands are applicable, i.e. commands, which do not need a data buffer themselves, are particulary suitable to be used for CCI (e.g. Test Unit Ready), because they are easy to handle. Self defined SCSI commands could be used as well.

To easily install the driver, according to the exemplary embodiment of the present invention a driver installation sequence gets injected in an executable. This is used to add the code, which is extracting and installing the driver to any executable (called Target.exe in the following). Therefore, the following tasks are performed:

Create a dynamically loadable library file (e.g DLL for Windows operating systems).
- Containing the driver.
- Implements and forwards the interface of a dynamically loadable library (called target library) which is used by Target.exe. (e.g Kernel32.dll on Windows operating systems).
- Contains a startup routine, which is called when the library is loaded. (DllMain routine in DLLs on Windows operating systems). This startup routine extracts and installs the driver.
- The library can have any name, but the length of the name should not be longer then the name of the target library. To ease explaination it is called Inject.dll.

An executable contains a list of all dynamically loadable libraries (called import list), which are used.

When an executable is started every library listed in the import list is loaded and its startuproutine is executed.

The name of the target library (e.g Kernel32.dll) in the import list of Target.exe is replaced with the name of Inject.dll.

So when Target.exe is executed Inject.dll is loaded as well and its startuproutine is executed, which extracts and installs the driver.

The invention claimed is:

1. A method for protecting content within protected data areas on a target optical data medium against unauthorized copying with a computer, comprising:
   determining whether an optical data medium inserted into a drive of the computer is the target optical data medium or a non-target optical data medium, wherein the target optical data medium is a data medium protected against unauthorized copying with a computer, and
   when the inserted optical data medium is the target optical data medium,
   modifying read requests to the protected data areas so that either no data is read or the read data is modified, and/or
   modifying write commands in respect to the data within the protected data areas to a recordable data medium or other storage so that the written data is modified to be useless,
   wherein the determining and modifying steps are performed by a driver installed on the computer, and
   wherein the modifying of read requests and/or write commands is performed only when no authentication of the computer is available.

2. A method according to claim 1, wherein the determining and modifying steps are performed by routines implemented into a drive control layer within the computer.

3. A method according to claim 2, wherein the routines replace a dispatch routine and a completion routine, and have the functionality to perform the determining and modifying steps and to call the replaced dispatch and completion routines for their execution based on the original or modified read requests and/or write commands.

4. A method according to claim 2, wherein the routines are implemented by the driver that is installed by an executable that is automatically started when a target optical data medium is inserted into the drive.

5. A method according to claim 4, wherein the driver is automatically loaded after each start of the computer, and/or does not comprise an unload routine, and/or changes its name randomly, and/or comprises filetimes that are set randomly, and/or comprises code that is changed randomly, and/or is installed multiple times, but is only one time active, and/or can be installed by installation programs spread all over the computer's system.

6. A method according to claim 4, wherein the driver comprises a communication interface to allow an exchange of control data and/or authentication data.

7. A method according to claim 1, wherein a target optical data medium is distinguished from a non target optical data medium by evaluating a predetermined session of a optical data medium in respect to special modifications, and/or at least one of the tables of contents of the optical data medium in respect to special entries, and/or a predetermined session of the optical data medium in respect to special subcode modifications, and/or predetermined data stored on the optical data medium in respect to a watermark.

8. A method according to claim 1, wherein a protected data area is identified on basis of a sector type, and/or a range of sectors, and/or sectors that are subject of specific read sequences.

9. A method according to claim 1, wherein a protected data area is defined by at least one predetermined area, and/or data stored on the optical data medium itself.

10. A method according to claim 1, wherein the modifying of read requests so that the read data is modified to be useless, and/or the modifying of write commands so that the written data is modified to be useless comprises aborting a corresponding IO Request and/or IO Command with an error, and/or completing the corresponding IO Request and/or IO Command, but without processing the actual request and/or command, and/or modifying the respective data so that it is modified to be useless.

11. A method according to claim 1, wherein the modifying of read requests and/or write commands is performed only if no authentication of the computer as having full access to the content within the protected areas is available.

12. A method according to claim 1, wherein the modifying of read requests and/or write commands is performed only if no authentication of a user of the computer as having full access to the content within the protected areas is available.

13. A non-transitory computer readable storage medium including computer executable instructions, which when executed by a processor, cause the installation of a driver on the non-transitory computer readable storage medium which performs a method comprising:
determining whether an optical medium inserted into a drive of the computer is a target optical data medium or a non-target optical data medium, wherein the target optical data medium is a data medium protected against unauthorized copying with a computer, and
when the inserted optical data medium is the target optical data medium,
modifying read requests to protected data areas of the target optical data medium so that either no data is read or the read data is modified to be useless, and/or
modifying write commands in respect to data within protected data areas to a recordable data medium or other storage so that the written data is modified to be useless,
wherein the modifying of read requests and/or write commands is performed only when no authentication of the computer is available.

14. An optical data storage medium including protected areas and computer executable instructions, wherein when the optical data storage medium is inserted into a drive of a computer, the computer executable instructions cause the installation of a driver on the computer which identifies the optical data storage medium as a target optical data medium which is protected against unauthorized copying with a computer and performs a method comprising:
modifying read requests to protected data areas of the target optical data medium so that either no data is read or the read data is modified to be useless, and/or
modifying write commands in respect to data within protected data areas to a recordable data medium or other storage so that the written data is modified to be useless,
wherein the modifying of read requests and/or write commands is performed only when no authentication of the computer is available.

15. An optical data storage medium according to claim 14, wherein the computer executable instructions are arranged in a data session of a multi-session CD that also comprises an audio session.

16. A method for protecting content within protected data areas on a target optical data medium against unauthorized copying with a computer, comprising:
determining whether an optical data medium inserted into a drive of the computer is the target optical data medium or a non-target optical data medium, wherein the target optical data medium is a data medium protected against unauthorized copying with a computer, and
when the inserted optical data medium is the target optical data medium,
modifying read requests to the protected data areas so that either no data is read or the read data is modified, and/or
modifying write commands in respect to the data within the protected data areas to a recordable data medium or other storage so that the written data is modified to be useless,
wherein the determining and modifying steps are performed by routines of a driver implemented into a drive control layer within the computer, wherein the routines replace original routines of the drive control layer, and
wherein the modifying of read requests and/or write commands is performed only when no authentication of the computer is available.

17. A method for protecting content within protected data areas on a target optical data medium against unauthorized copying with a computer, comprising:
determining whether an optical data medium inserted into a drive of the computer is the target optical data medium or a non-target optical data medium, wherein the target optical data medium is a data medium protected against unauthorized copying with a computer, and
when the inserted optical data medium is the target optical data medium,
modifying read requests to the protected data areas so that either no data is read or the read data is modified, and/or
modifying write commands in respect to the data within the protected data areas to a recordable data medium or other storage so that the written data is modified to be useless,
wherein the determining and modifying steps are performed by a driver installed on the computer, wherein the driver is installed by an executable that is automatically started when a target optical data medium is inserted into the drive, and
wherein the modifying of read requests and/or write commands is performed only when no authentication of the computer is available.

* * * * *